April 1, 1952  A. F. FUKAL  2,590,952
PORTABLE ELECTRIC FAN
Filed Jan. 13, 1949  8 Sheets-Sheet 1
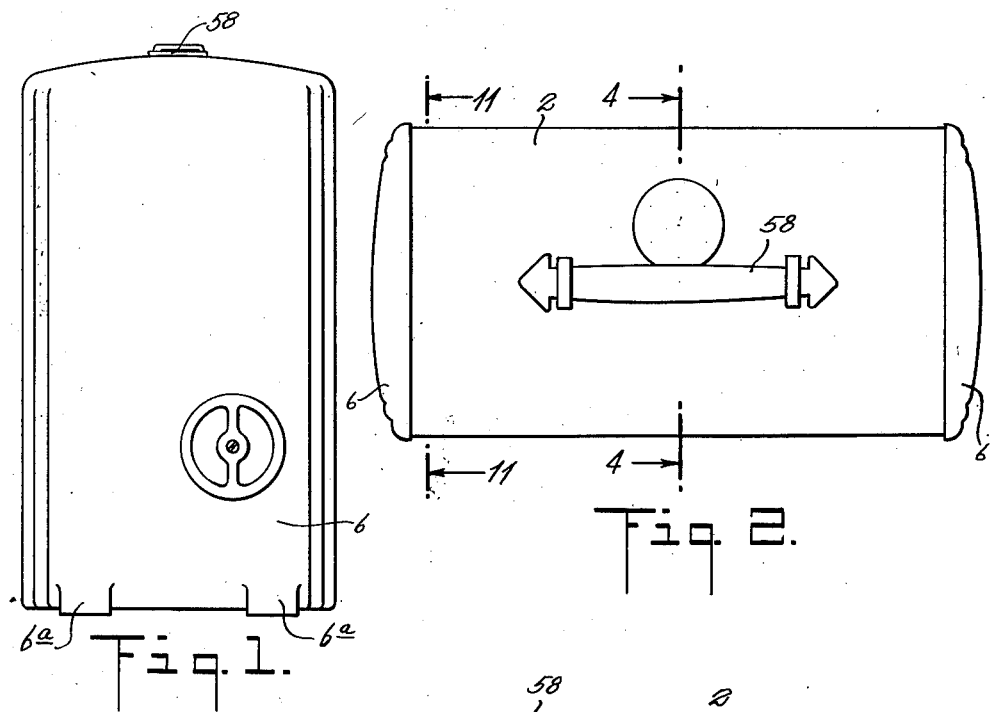
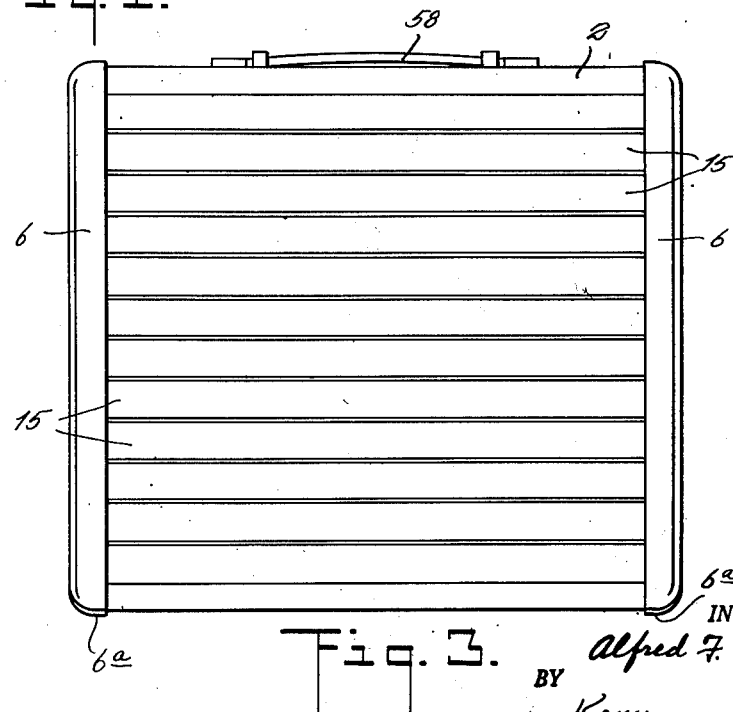
INVENTOR.
Alfred F. Fukal
BY Kenyon & Kenyon
ATTORNEYS April 1, 1952 A. F. FUKAL 2,590,952
PORTABLE ELECTRIC FAN
Filed Jan. 13, 1949 8 Sheets-Sheet 2
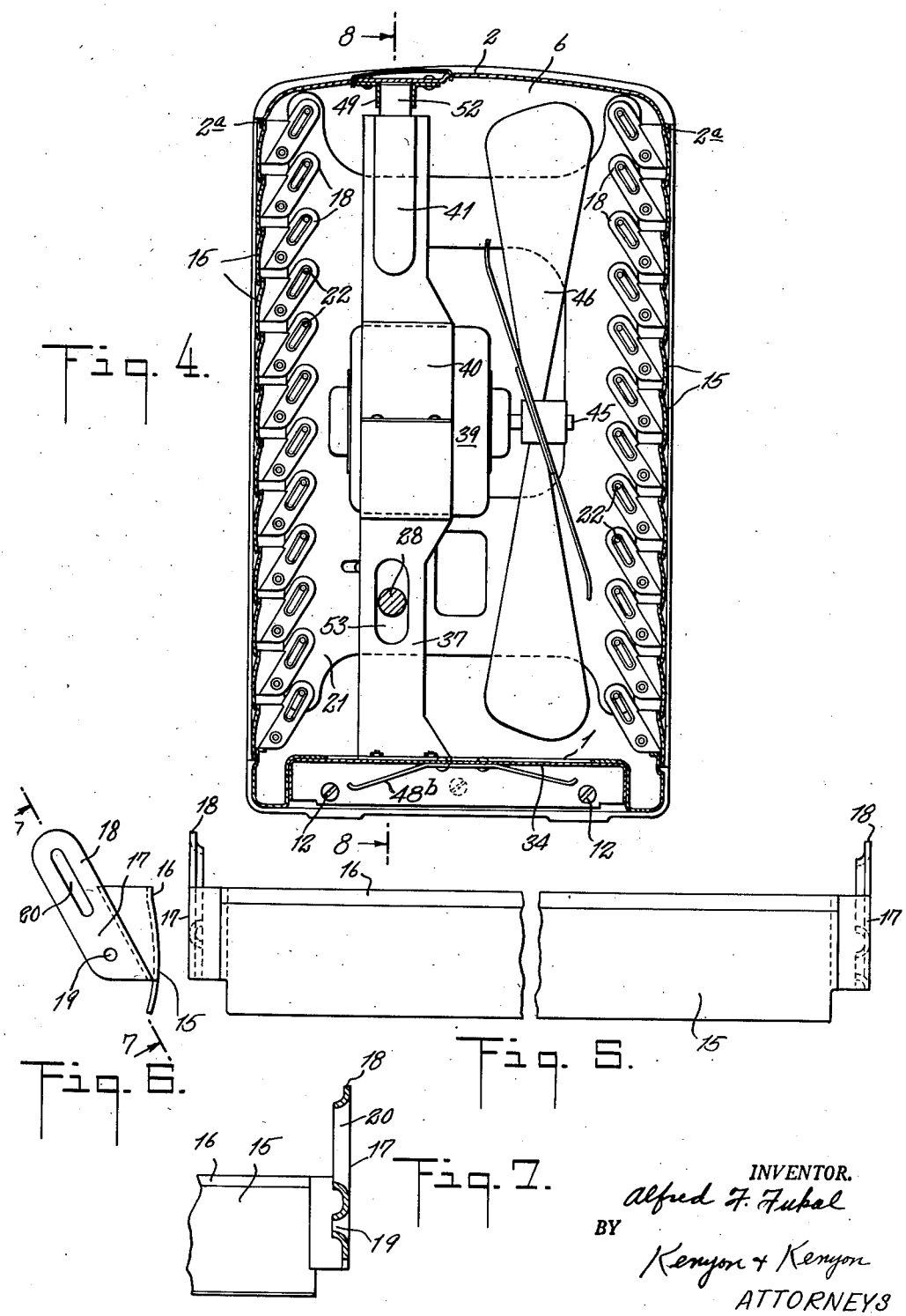
INVENTOR.
Alfred F. Fukal
BY
Kenyon & Kenyon
ATTORNEYS April 1, 1952     A. F. FUKAL     2,590,952
PORTABLE ELECTRIC FAN Filed Jan. 13, 1949     8 Sheets-Sheet 3

INVENTOR.
Alfred F. Fukal
BY
Kenyon & Kenyon
ATTORNEYS

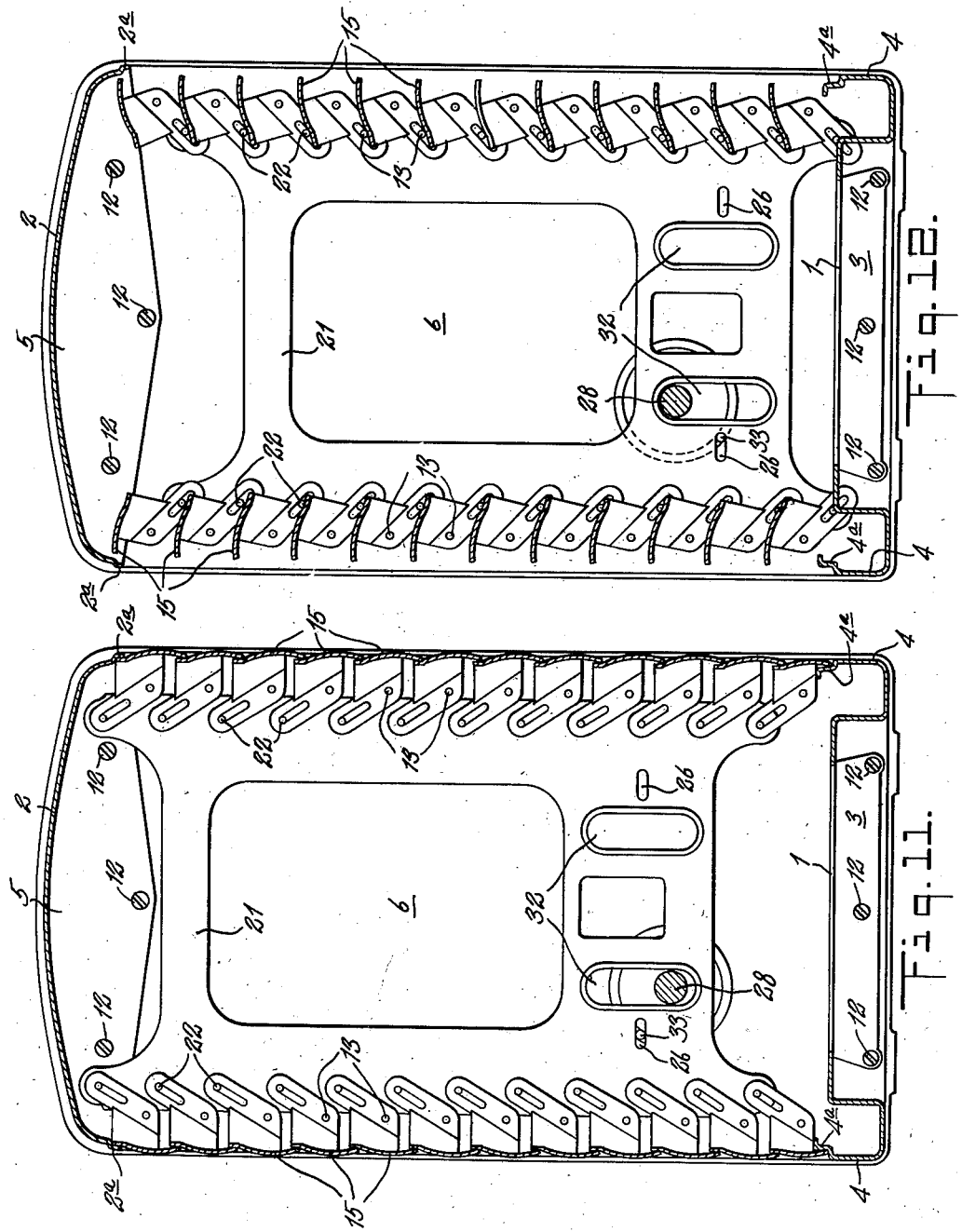

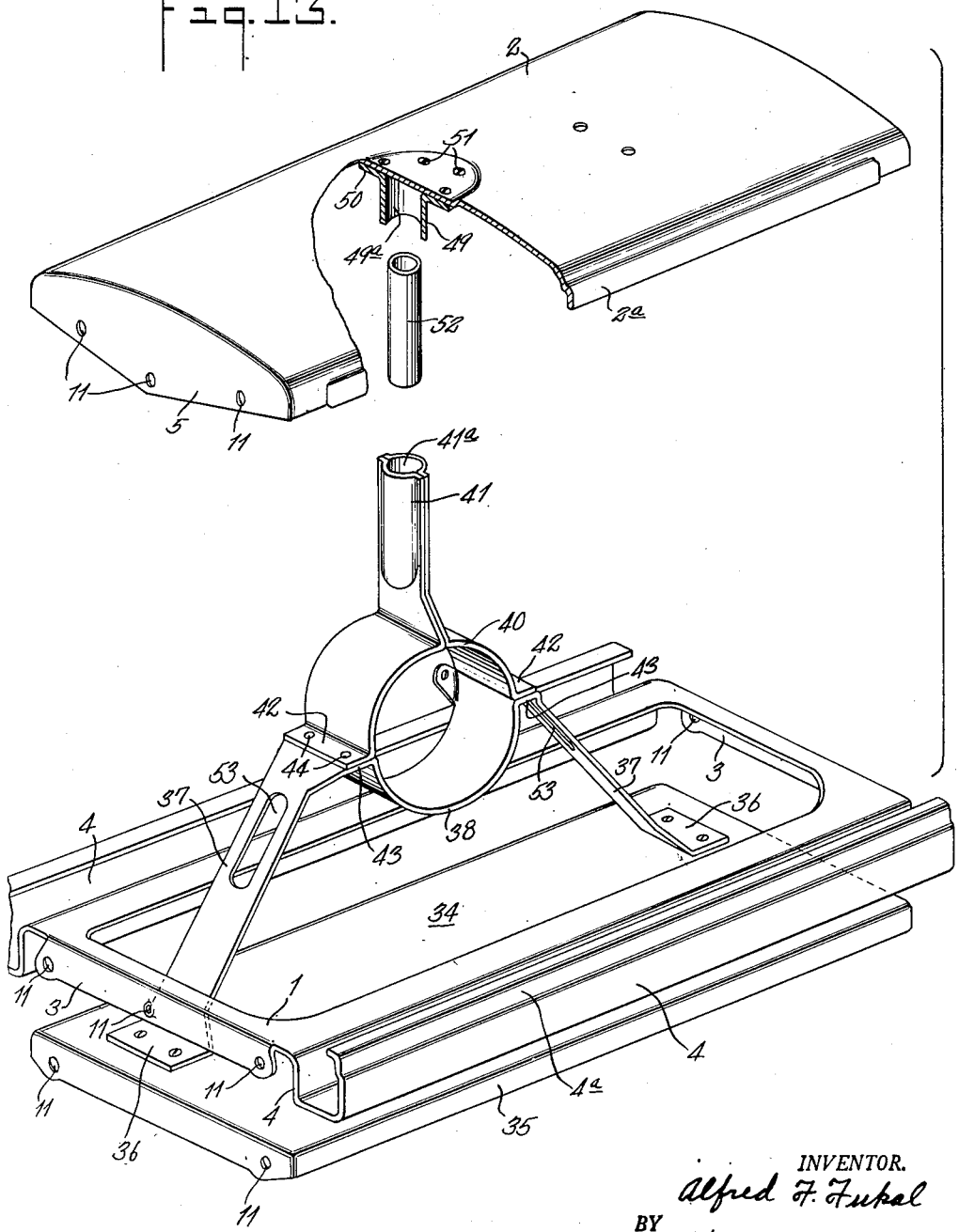

April 1, 1952 A. F. FUKAL 2,590,952
PORTABLE ELECTRIC FAN
Filed Jan. 13, 1949 8 Sheets-Sheet 6

INVENTOR.
Alfred F. Fukal
BY
Kenyon & Kenyon
ATTORNEYS

April 1, 1952     A. F. FUKAL     2,590,952
PORTABLE ELECTRIC FAN

Filed Jan. 13, 1949     8 Sheets-Sheet 7

INVENTOR.
Alfred F. Fukal
BY Kenyon & Kenyon
ATTORNEYS

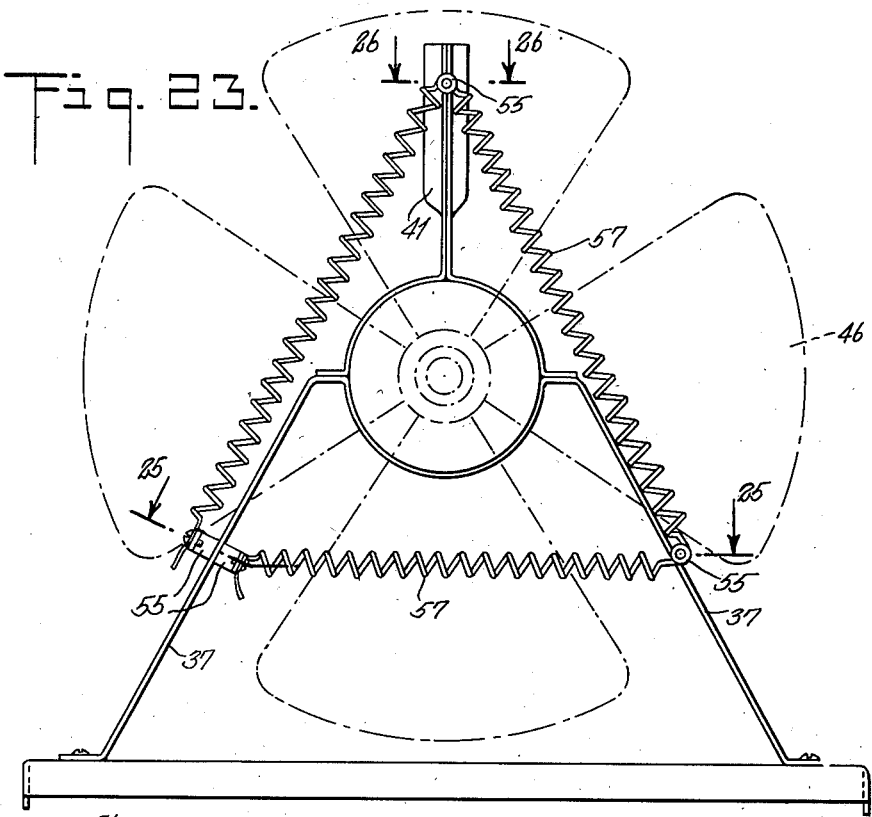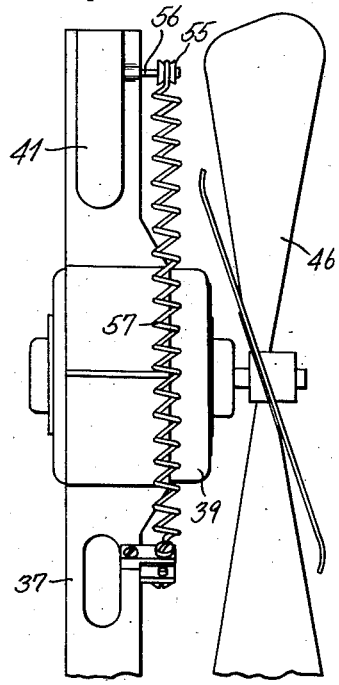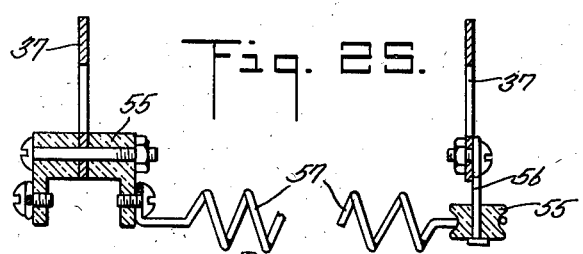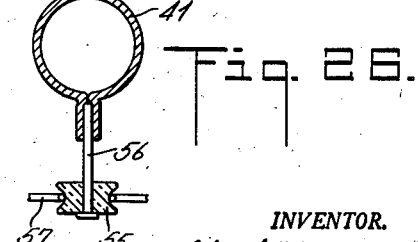

Patented Apr. 1, 1952

2,590,952

UNITED STATES PATENT OFFICE 2,590,952

PORTABLE ELECTRIC FAN

Alfred F. Fukal, Cambridge, Ohio, assignor to
William W. Welch, Cincinnati, Ohio Application January 13, 1949, Serial No. 70,780

4 Claims. (Cl. 230—274)

This invention is a portable electric fan that is unique in that it has the external appearance of a traveler's overnight bag or similar case. It is an attractive device that is completely enclosed to protect it from dust and dirt when it is not being used, yet it may be immediately placed in action without fuss or bother.

When in action, the portable fan, provided by the present invention, has aerodynamic advantages. Thus, it provides a propeller blade with adjustable louvers at its front for not only controlling the direction of the air moved by the fan, but the volume as well, and it does this without loading the necessary electric motor to the same extent as is usual when the adjustable louvers are more or less closed to reduce the volume. The construction of the new fan adapts it to be set on a window sill for either driving air into or from a room without the loss of efficiency that normally results from the characteristic of ordinary propeller fans of drawing the air to the fan periphery radially thereof.

In addition to the noted advantages, the fan of the present invention has important assembly and repair advantages. The invention provides for a cased fan embracing a self-contained case assembly and a self-contained electric fan assembly whereby the former may be produced and assembled in a mechanical department and the latter produced and assembled in an electrical department, with the two units then brought together and assembled to provide the completed fan. The features under discussion are of importance in connection with repair work, because they permit the separation of the completed fan into the two units previously mentioned permitting mechanical repairs of the case, quite free from complications due to electrical mechanisms, or repair of the fan unit by an electrician, without interference by the mechanical parts of the case assembly.

Although the present invention is particularly concerned with a portable electric fan, there is the possibility that its principles might be applied to other types of equipment. This should be kept in mind in considering the disclosure and claims. However, in the portable electric fan field the advantages of the present invention are so unique that they involve new and unexpected results in this field regardless of their applicability to other types of equipment.

The new fan, in what is presently considered its best form, is illustrated by the accompanying drawings, in which:

Fig. 1 is an end view of the cased fan;

Fig. 2 is a top view of Fig. 1;

Fig. 3 is a side view of Fig. 1;

Fig. 4 is a vertical cross section taken from the line 4—4 in Fig. 2;

Fig. 5 is a top view of one of the louvers removed from the case;

Fig. 6 is an end view of Fig. 5;

Fig. 7 is a section taken from the line 7—7 in Fig. 6;

Figures 8, 9, 10:
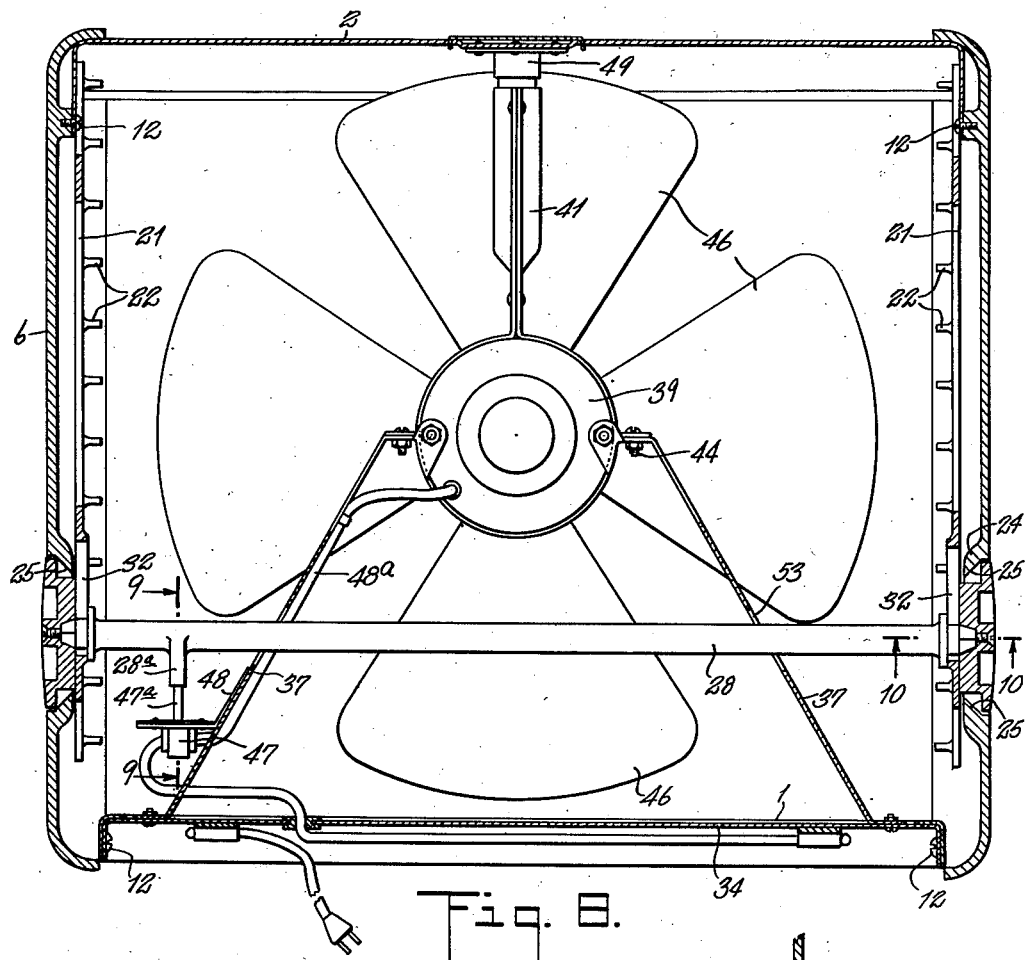
Fig. 8 is a vertical longitudinal section taken from the line 8—8 in Fig. 4.
Figures 14, 15:
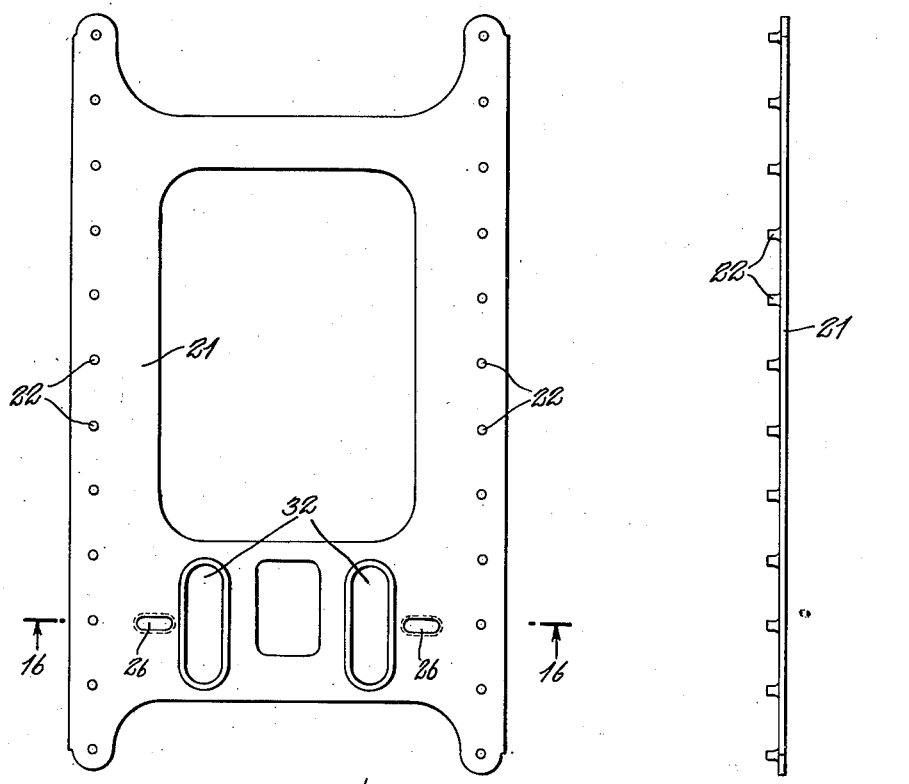
Figure 16:
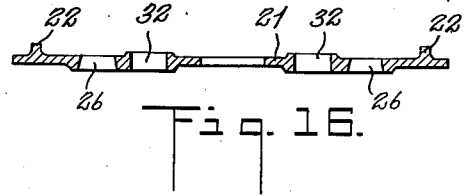
Figure 17:
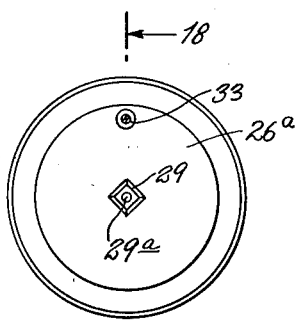
Figure 18:
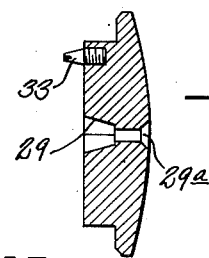
Figures 19, 20, 21:
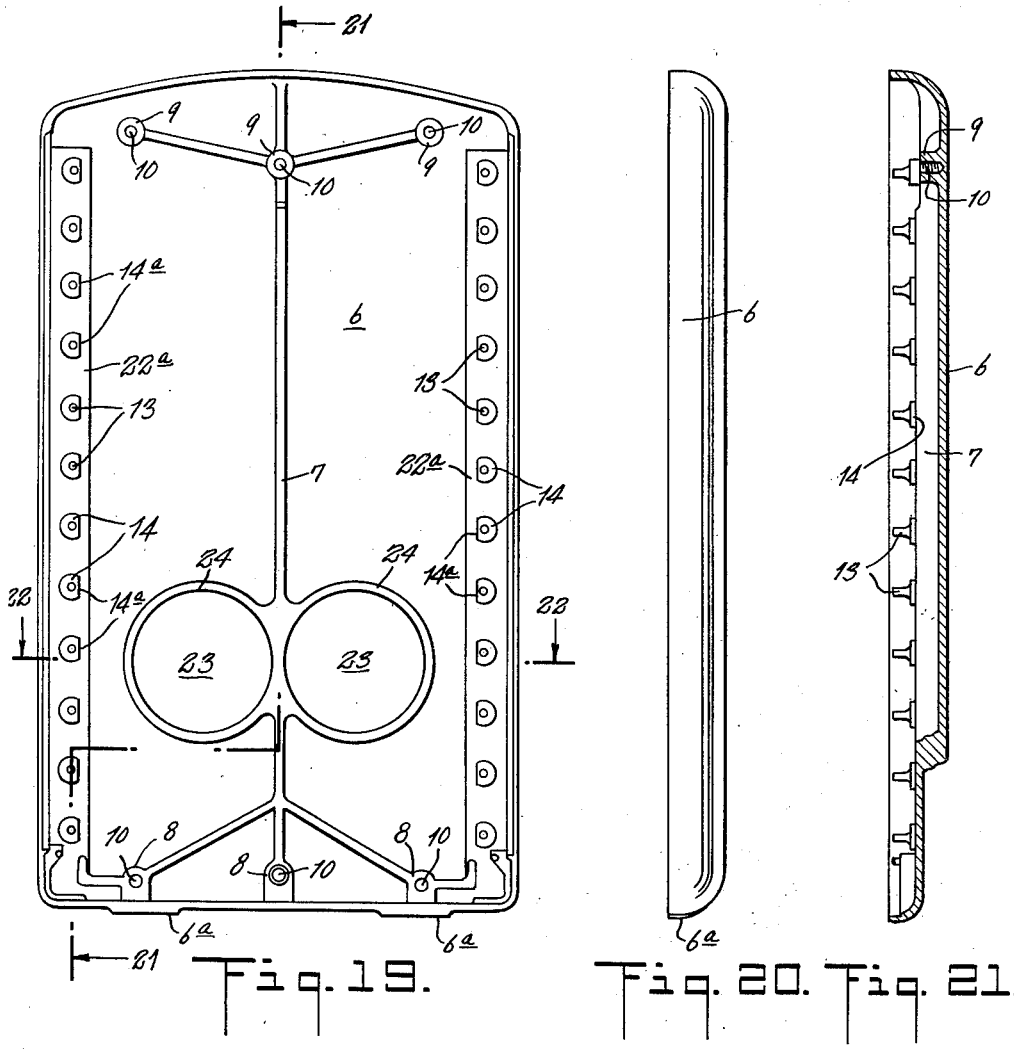
Figure 22:
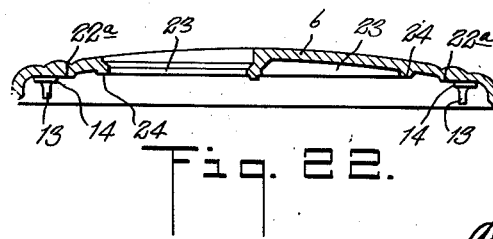

Figs. 9 and 10 are sections taken from the lines 9—9 and 10—10, respectively, in Fig. 8;

Fig. 11 is a cross section taken from the line 11—11 in Fig. 2 and showing the louvers in closed positions;

Fig. 12 is a duplicate of Fig. 11 but shows the louvers in open position;

Fig. 13 is an exploded view showing the interassociation of certain parts provided in connection with the feature of the separate self-contained case and fan units;

Fig. 14 shows a slide board used to control the louver action and shown in assembled form in Figs. 8 and 11, for example;

Fig. 15 is an edge view of the board shown by Fig. 14;

Fig. 16 is a cross section of the board taken from the line 16—16 in Fig. 14;

Fig. 17 shows an operator knob used to control the louver action;

Fig. 18 is a cross section taken from the line 18—18 in Fig. 17;

Fig. 19 shows the inside of one of the case end panels;

Fig. 20 is an edge view of Fig. 19;

Figs. 21 and 22 are sections taken from the lines 21—21 and 22—22, respectively, in Fig. 19;

Fig. 23 is a suggestive modification of the self-contained electric fan unit, featuring an electric resistance heater;

Fig. 24 is an end view of Fig. 23; and

Figs. 25 and 26 are sections taken from the lines 25—25 and 26—26, respectively, in Fig. 23.

The illustrated self-contained case assembly has a bottom frame 1 that is provided with a large window, so that this frame is centrally open. The case top 2 is completely closed. Both this bottom frame and top may be made of sheet aluminum alloy, die stampings. They are made with an elongated, rectangular contour, this being the horizontal cross sectional shape of the case, and the dimensions may generally follow those of a traveler's overnight bag.

The bottom frame 1 has depending end flanges 3, at both ends, and its side edges are formed to provide longitudinally extending, upwardly facing, channel sections 4. The inside edges of these channel sections are flush with the top of the bottom frame 1 and the channel sections should be made fairly deep since they provide longitudinal beam strength for the complete device.

The top 2 is made transversely rounded to provide it with structural rigidity, which is of importance when light-gauge sheet metal is used, and its ends have depending flanges 5.

The case has end panels 6 that duplicate each other and are preferably injection moldings of a plastic suitable for structural purposes while providing an attractive appearance.

Each end panel 6 has a longitudinally extending, stiffening rib 7 extending from its inside and branching as required to interconnect lower abutments 8 and upper abutments 9, of which three are preferably provided in each instance. The abutments 8 may register with the flanges 3, of the bottom frame 1, while the abutments 9 register with the flanges 5, of the case top 2. These parts are fastened together by the abutments 8 and 9 being provided with screw holes 10 with which screw passage holes 11, in both the flanges 3 and 5, may register.

Assembly of the bottom frame 1, top 2 and end panels 6 may be effected by butting the end panels 6 against the flanges 3 and 5, of the bottom frame and top, and using screws 12 which pass through the passages 11 and engage the threaded screw holes 10, in the abutments of the end panels. These screw holes should not extend through the end panels since this detracts from the appearance of the device. The holes may be tapped, so machine screws may be used, or may be plain, in which event self-tapping.

Prior to the above assembly the louvers and their controlling mechanism are installed.

Each end panel has two, parallel, longitudinally extending rows of pins 13, projecting from its inside with the rows oppositely spaced so they are adjacent the vertical side edges of the end panels. These pins may be made as part of the injection moldings, and since the end panels are identical the pins 13 of one panel register with the opposite pins of the other when the end panels are arranged with their insides facing, the pins being symmetrically arranged for this purpose. The pins 13 are illustrated as having generally cylindrical outer ends and as flaring smoothly to pedestals 14 which then join with the end panel proper.

The louvers 15 may also be die stamped from sheet aluminum alloy. Each is preferably made so that it is transversely concavo-convex throughout its main body portion, to impart structural rigidity, but which has a longitudinally extending, flat strip section 16 along its upper edge. It is formed to provide transversely extending end wings 17 having upwardly angling, extending levers 18. The wings 17 are provided with pin holes 19, for the pins 13, while the levers 18 are provided with longitudinally extending slots 20.

Slide boards 21, which are preferably made of stiff and relatively hard non-metallic material having good structural strength, appearance not being too important in this instance, are adapted to slide vertically on the inside of each of the end panels 6 between these insides and the outsides of the levers 18 of the various louvers. These boards 21 may be in the form of rectangular frames and must be slightly narrower than the distance between the rows of pins 13, on the opposite side edges of the end panels 6, the plates 21 being required to ride between the two rows of pins in each instance. Each plate 21 provides transversely spaced rows of pins 22 which may be made substantially like the pins 13, excepting that the pedestals 14 are eliminated and the pins 22 may be made of metal. The pins 22, on the boards 21, are arranged so that when the louvers 15 are positioned between the end panels 6, with the latters' pins 13 in the louvers' pin holes 19, and thus pivotally mounting each lever for angular adjustment, the pins 22 may register with the slots 20 in the levers 18, of the various louvers, when the boards 21 are positioned between these levers and the insides of the end panels 6. Furthermore, the arrangement of the pins 22 is such that when the boards 21 are moved vertically all the louvers simultaneously close, and when the boards 21 are moved downwardly the louvers 15 are open. The slide boards 21 are retained simply by being held between the various louver levers and the insides of the end panels, with their motion thus laterally restricted so they cannot separate from the insides of the end panels 6, and with the pin and slot connections between the boards and the louver levers, in cooperation with the pivotal mounting of the louvers, restricting the sliding action of the slide boards 21 to vertical linear motion.

It is to be noted that the pins 13 of the end panels, and the pin holes 19 of the various louvers, are arranged so that the louvers slightly overlap, when closed, in a water shed arrangement. The bottom edge of each curved main portion, of each louver, rests on top of the flat strip 16 of the next lower louver. The upstanding outer flange of the channel sections 4, of the base frame 1, are jogged inwardly, as at 4a, so that the bottom edges of the lowermost louvers associate therewith, like they do with the upper edges of the louvers in the other instances. The top 2 is provided with depending flanges 2a providing inside surfaces against which the flat top strip 16 of the top louvers press when the louvers are closed. It follows that, when the louvers are all closed, the case is substantially dust tight and that its louvered sides have the appearance of solid panels that are horizontally slightly flutted or corrugated in appearance.

Assembly of any louver system is normally a difficult job, but this assembly is greatly eased in the case of the present invention. The pin holes 19 and slots 20, of each of the louvers, are formed with flaring entrances generally matching the flare of the various pins 13 and 22. Therefore, with the slide boards 21 superimposed on the insides of the end panels, with the pins 22 facing inwardly with the pins 13, the various louvers may be positioned, by suitable jigs, and the end parts moved together. Any slight misalignment between the various pins and the pin holes and slots, of the various louvers and their levers, are automatically accommodated by the guiding action of the flared entrances of the various pin holes and slots. As the end parts are moved further together the flared shapes of the various pins coincide with the flared entrances of the various pin holes and slots, and when the screws 12 are inserted and tightened, the base frame 1 and top 2 having been appropriately positioned, the parts are all tightened together so that the louvers do not rattle. At the same time they are relatively free for angular adjustment by vertical motion of the slide boards 21. The slide boards 21 cannot rattle since they are pressed between the levers 18, of the various louvers, and the insides of the end panels. They do not tend to vibrate since they are made of non-metallic material. Smooth sliding action of the slide boards 21 is effected by the end panels 6 having slideways 22a to which the edge portions of the slide boards 21 are confined by reason of the pedestals 14 being provided with flat sides 14a against which the edges of the slide boards abut.

Each end panel 6, they being identical, may be injection molded to provide twin circular recesses 23 which are surrounded by flanges 24. These recesses are spaced on either side of the reinforcing rib 7 which extends along the longitudinal center line of each end panel. Therefore, by cutting out opposite ones of the disk-like bottoms of these circular recesses, it becomes possible to provide aligned central holes for the opposite end panels of a case. In each instance the other recesses are left alone so that the case is externally closed at these locations. These recesses extend from the insides only of the end panels, the exterior of the end panels being smooth. While opening the alternate ones of the recess, which may be done by a cutting operation, the outsides of the resulting openings are countersunk, as at 25, so the resulting openings have peripherally inwardly extending flanges on the inside portions. The flanges 24 provide enough material for easy countersinking.

The vertically moving slide boards 21 are provided with portions registering with the openings resulting from the described cutting, and these portions are provided with transversely extending slots 26. Since the slide boards 21 are made identical, so they may be stamped with the same die, each board is provided with two of these transverse slots 26, although only one is used in each instance, as will presently be appreciated. Peripherally recessed and transversely finned disks or wheels 26a, the transverse fins being indicated at 27, are inserted in the openings through the mutually registering recess 23 of the two end panels, and these wheels are rotatively interconnected by a rotary shaft 28 that extends completely through the case assembly. These disks or wheels are identical. The disks or wheels 26a may be provided, on their insides and at their axes, with conical recesses 29 into which tapering ends 30, of the shaft 28, fit, the shaft being provided with flanges 31 which butt against the insides of the slide boards 21. These slide boards 21 are provided with pairs of longitudinally elongated, vertically extending, slots 32 through which the shaft 28 passes, so the slide boards 21 may reciprocate vertically, and each of the disks or wheels 26a is provided with an inwardly extending pin 33 which works in the slots 26 which transversely register in the case of the pair of the boards 21 used.

Preferably the disk or wheels 26a are proportioned so they fit flushly in the cutout ones of the recess 23, their fins 27 providing a purchase for the fingers of the operator and rotation of the wheels or disk 26a being translated, through the pin and slot connections consisting of the slots 26 and pins 23, to linear motion by the slide boards 21. Therefore, the operator may use either or both of the disks or wheels 25, to simultaneously operate both series of louvers. It will be remembered that the arrangement is such that the louvers on opposite sides of the case simultaneously open and shut together. These wheels or disks obviously function as louver operators.

Excepting for one feature presently described, the foregoing completes the description of the self-contained case assembly. The resulting case is attractive in appearance and closes up in a substantially dust-tight manner. When closed all its surfaces are substantially flush, an attractive and so-called streamlined appearance resulting. As previously indicated the result is somewhat like that of a nice-appearing overnight bag.

The self-contained electric fan unit comprises a flat base 34 that is rectangular shaped to fit inside the flanges 3 and the inner flanges of the channel sections 4, of the case's bottom frame 1. This base 34 is provided with peripherally surrounding depending flanges 35 which fit snugly within the mentioned flanges of the case's bottom frame 3. However, the top of this base 34 is completely closed, instead of being open as is the central portion of the base frame 1, so this part 34 can complete the closure of the case. This base frame may be stamped from sheet aluminum alloy.

An integral length of sheet or strip metal, which is preferably steel, although aluminum may be used, is formed to provide pedestal portions 36, converging struts 37 and a depending semi-cylinder 38, between the adjacent ends of the converging strut sections 37. The pedestal portions 36 may be riveted or screwed to the base 34. The electric motor 39, used to power the fan, rests in this semi-cylinder 38 and is retained there by an assembly consisting of two strips of sheet or strip metal, which may be the same metal from which the other motor mounting part is made, to cooperatively provide an upper semi-cylinder 40 and an upstanding socket 41 providing a cylindrical bearing 41a. As shown by the drawings, the two strips are each formed to provide quarter cylinders with their upper junctions formed into upstanding parts which are stamped to provide two longitudinally flanged semi-cylinders, the flanges being spot welded or otherwise fastened together. Furthermore, this part now under disclosure may be provided with radially extending flanges 42 and the ends of its semi-cylindrical portion 38 may be similarly flanged as at 43, between it and the struts 37. With the motor 39 of the type providing a cylindrical exterior, it may rest in the semi-cylinder 38, with the semi-cylinder 40 provided by the interjoined quarter cylinders 40 on top of it, and the flanges 42 and 43 interfastened, in each instance, as by screws or nuts 44, the motor 39 is firmly positioned above the base 34. This motor may be an ordinary electric motor having a rotary shaft 45 on which a propeller type rotary fan 46 is mounted for rotation by this shaft. Naturally the struts 37 and the diameter of the fan 46 should be correlated so the fan is positioned, inside the case, for rotation without striking anything.

The wiring for the fan may be conventional and it is therefore not schematically shown, but it should include a controlling switch 47 which may be mounted by an arm 48 on one of the struts 37.

The wiring cord 48a extends from the motor 39, with one lead going through this switch 47 and down through a bushed hole in the base 34, the bottom of the latter being provided with spring metal clips 48b about which the cord may be looped for storage. Due to its construction, previously described, this base is recessed so that the stored wiring is never in the way. The end panels may include short legs 6a on which the completed fan may rest.

It now becomes apparent that the base 34 and the various parts mounted on it, provide a self-contained electric fan unit. This unit is easily separable from the base, it being secured thereto by reason of its depending end flanges being provided with holes 11 just like those in the depending end flanges 3, of the case's base frame, so the screws 12 may secure the base 34 in position. Separate screws might well be used for this purpose if desired. All the registering base holes are marked 11 for convenience.

It has been found that the assembled portable fan provides quieter operation if strip metal from which the struts 37, and its integrated parts, are made, is of light enough gauge to provide some elastic flexibility. Due to the flat shapes of the struts 35, and assuming adequate lightgauge material is used, the fan motor 39 may move in any direction. This, in turn, introduces the problem that the fan motor, and the propeller fan itself, may not be structurally braced adequately to resist abuse when the assembled portable fan is roughly treated. The nature of the assembly is such that it is adapted for use by travelers and the like, this indicating the possibility of abuse.

With the above in mind, the top 2, of the self-contained case assembly, is provided with a depending socket 49 having a flange 50, by which it may be attached to the bottom side of the top 2 through fastenings 51, so the socket 49 points downwardly in registration with the socket 41, of the electric fan assembly, when the base 34, of the latter, is installed. This socket 49 provides a cylindrical bearing surface 49a having the same diameter as 41a. The top 2 is illustrated with a depression providing a platform to which the flange 50 is fastened by the screws 51 and which thus assures a completely flat top. A name plate may be applied over the top surface of this depression, so the plate is flush with the top, thus providing a very attractive effect.

Now, with the sockets 41 and 49 arranged to mutually register when the self-contained electric fan assembly is joined with the self-contained case assembly, it becomes possible to support the fan motor 39, and its fan 46, against movement, in any other than vertical and rotative directions, by the use of a tube or pipe section 52 which fits in the bores 41a and 49a of the sockets 41 and 49, so as to interconnect them. This type of arrangement does not impede the assembly of the two units, yet it provides rigidity in the directions needed when the assembled fan is subjected to abuse. At the same time, it does not prevent the relatively elastic struts 37 from performing the desirable function of absorbing or dissipating the vibration resulting from operation of the fan. Furthermore, should the electrical unit become subjected to operational trouble, the whole unit may be separated from the case unit, simply by removing the ones of the screws 12 which fasten the base 34 to the bottom frame, it then being possible to lift the case from the base 34 so as to completely separate the parts. The part 52 should be slidable respecting the bearing surfaces which it fits.

Assembly or separation, of the electrical fan unit and the case unit, is interfered with by the shaft 28. The struts 37 are provided with longitudinally elongated slots 53 through which this shaft 28 passes, so the latter does not interfere with the vibration absorbing function of the struts 37. However, the shaft 28 does interfere with assembly and disassembly, but by simply removing one or both of the screws, indicated at 29a, which fasten the disk or wheels 26 to the tapered ends 29 of the shaft 28, so one or both of these wheels may be removed and the shaft 28 longitudinally withdrawn, this difficulty is avoided.

In a device of this character there is the danger that the user might forget to shut off the fan motor 39 when the various louvers are completely closed, in which event the motor 39 would overheat. However, this is prevented by the switch 47, it having an operator 47a adapted to interengage a projection 28a on the shaft 28, the arrangement being such that when this shaft is rotated so that the louvers almost or completely close, the switch 47 is thrown to off position by the projection 28a working the switch operator 47a. When this arrangement is used, the projection 28a is in the way of withdrawing the shaft 28 in one direction, but, since it may be withdrawn in the opposite direction assembling and disassembling trouble is not experienced. The parts 28a and 47a are free to separate when the two self-contained units are separated.

An unexpected advantage obtained by using the two panels formed by the louver series, is that when the louvers in front of the fan are partially closed to not only deflect the air flow moved by the propeller fan but also to reduce this flow, the louvers on the back of the fan are simultaneously partially closed to an equal degree. Therefore, the intake side of the fan is throttled and the mass of air inside the case tends to revolve with the propeller fan, this tending to reduce the load on the motor 39 so that it is loaded no more than if its front side were completely open. It follows that the double series of louvers not only provide for attractively closing the sides of the case, opposite the front and back of the propeller fan, but that they perform this additional function as well. Another advantage of the fan, cased as described, is that it tends to suck air smoothly in the intake side and eject it from the output side, regardless of the fact that the propeller fan itself may be the customary design having the usual characteristic of sucking air to it radially, as well as axially. The case prevents this characteristic from interfering with the efficient operation of the fan. Therefore, the fan, as an assembled unit, is particularly adapted to be set on window sills in domestic residences, in which use it very efficiently either sucks air to or from the room. An ordinary fan does not have this advantage due to its tendency to short circuit the air flow, by sucking air radially into its propeller fan.

Although intended primarily for moving air, the present fan may advantageously be provided with a heating means. The thought is not so much to actually heat rooms as to dry the air moved by the fan. That is to say, a portable fan of this character might be used by persons at the seashore who might find it desirable to dry clothing dampened by the sea air. With the above in mind, Figs. 23 through 26 show a modification wherein electrical insulators 55 are mounted by brackets 56 supported by the struts 37 and the socket 41, whereby to provide a triangular outline in which a triangularly arranged coil 57 may be arranged with its ends extending for incorporation in the fan circuit. This coil may be of wire made of one of the nickel-chrome alloys suitable for electric resistance heaters, and its ends may be connected to the fan circuit through the control of the switch 47, if desired. Although the electric resistance heater shown might do little more than assure a draft of dry and slightly warmed air, it is possible to incorporate a heater of greater capacity so that the fan unit might actually be used to warm a room.

It has been indicated how the shaft 28 must be accommodated by the struts 37, by the latter having longitudinally extending slots 53. Some such arrangement is also indicated in the case of the slide boards 21, this being provided by the elongated slots 32. These slots should be made long enough to permit the proper sliding action or linear motion of the slide boards 21, without interference by the shaft 28.

There are various details involved about the construction of the cased fan, disclosed herein, which might advantageously be employed to enhance its use. For example it might well be provided with a handle, generally indicated at 58, and other details might be provided to even further enhance its convenience or appearance.

As previously suggested, it is considered preferable to make the end panels in the form of injection moldings made of suitable plastics. Likewise, the disks or wheels 26a may very well be made as injection moldings. The slide boards may be stamped from flat non-metallic sheets. All of the metal parts may be made by cold forming metal sheet and strip of appropriate gauges. Aluminum alloys are used as much as possible to decrease the weight of the assembly. Even the fan motor supporting parts may be made of aluminum alloy if desired. The external appearance of the assembly is extremely attractive, yet production and repair costs are kept down by the unique construction used. While obviously adapted for travelers, the portable fan of the present invention is equally attractive for permanent home use.

The invention has other advantages than those specifically pointed out hereinbefore. For example the flaring pedestals 14 of the pins 13 not only facilitate assembly as indicated but they also provide large bearing areas for the parts which largely eliminate the chance for looseness resulting from wear. Therefore, the louvers and their operating parts are maintained free from any tendency to rattle. This advantage may be considered even more important than the easy assembly advantage.

Other materials may be used than those specifically indicated. In many instances plastics may be used where metal has been indicated. Casting may be used at places instead of sheet material or die stampings. Generally speaking the invention lends itself to production of its parts by various practices.

I claim:

1. A case including opposite end panels with their mutually opposed insides provided with oppositely registered pins arranged in rows extending longitudinally respecting said panels, a series of louvers each having longitudinally extending pin holes at their opposite ends receiving said pins so that said louvers are pivotally mounted thereby transversely between said end panels, levers extending transversely from said louvers at least at one end of said series thereof, whereby said levers are substantially parallel to said end panels, a slide board arranged between said levers and one of said end panels adjacent thereto, whereby said board is positioned respecting lateral separation from said end panel, and pin and slot connections between each of said levers and said board and adapted to cause simultaneous swinging of said levers and linear movement of said board in a direction parallel said series, and means for reciprocating said board in line with said movement thereof, whereby to cause simultaneous swinging of said levers with resulting angular adjustment of said louver series.

2. The case defined by claim 1 with said pin holes and the slots of said connections having flaring entrances for their cooperating pins, whereby to facilitate assembly of said casing by aiding in registering said pins with their cooperating holes and slots, and tending to prevent said louvers from rattling.

3. The case defined by claim 1 with said one of said end panels provided with a hole registering with a portion of said board, a rotary wheel mounted in said hole and a pin and slot connection between the inside of said wheel offset from its axis and said board and adapted to translate rotation of said wheel into said linear motion by said board, said wheel being operable from outside said end panel and providing an operator for adjusting the angularity of said louver series.

4. The case defined by claim 1 with both ends of said louvers provided with said levers and including two of said plates respectively arranged, as defined, flatly against the insides of each of said end panels, and with both of said end panels provided holes registered with portions of the respectively adjacent ones of said plates, rotary wheels rotatively interconnected and mounted in each of said holes by a rotary shaft extending through said casing, said plates having openings for passing said shaft and which permit said linear motion by said plates, and pin and slot connections between each of said wheels offset from their axes and the adjacent ones of said plates and adapted to translate rotation of said wheels into said linear motion by said plates with the latter moving simultaneously in synchronism.

ALFRED F. FUKAL.

REFERENCES CITED

The following references are of record in the file of this patent:

UNITED STATES PATENTS

| Number | Name | Date |
| --- | --- | --- |
| 1,713,648 | Feinberg et al. | May 21, 1929 |
| 1,713,946 | Buckley | May 21, 1929 |
| 1,828,016 | Andres | Oct. 20, 1931 |
| 1,873,343 | Seyfried | Aug. 23, 1932 |
| 1,917,327 | Preston | July 11, 1933 |
| 1,971,827 | Morse | Aug. 28, 1934 |
| 2,037,250 | MacDonald | Apr. 14, 1936 |
| 2,141,923 | McMahan | Dec. 27, 1938 |
| 2,268,801 | Carlton | Jan. 6, 1942 |
| 2,323,178 | Denman | June 29, 1943 |
| 2,355,836 | Willey | Aug. 15, 1944 |
| 2,525,853 | Bauer | Oct. 17, 1950 |